United States Patent Office 3,263,794
Patented August 2, 1966

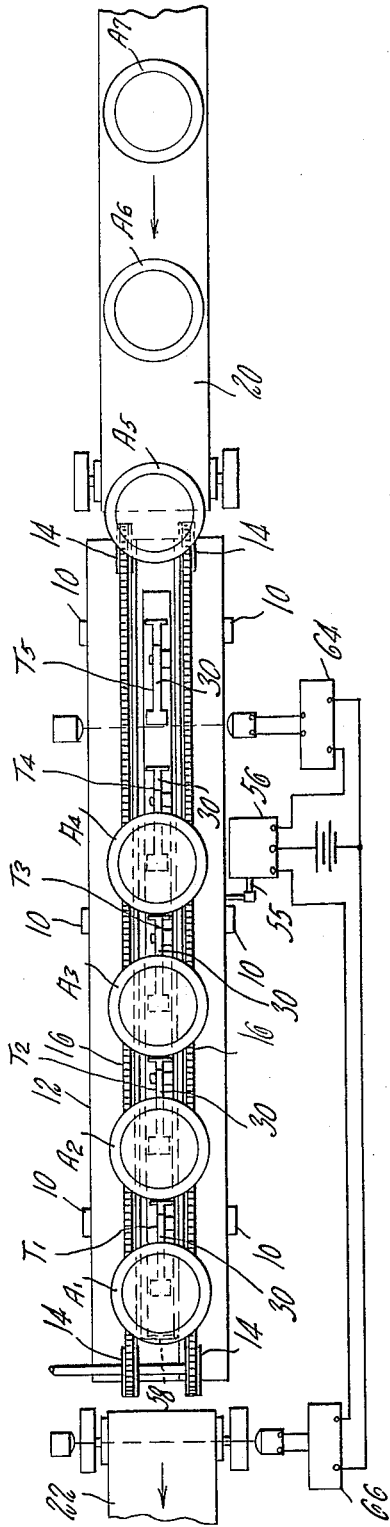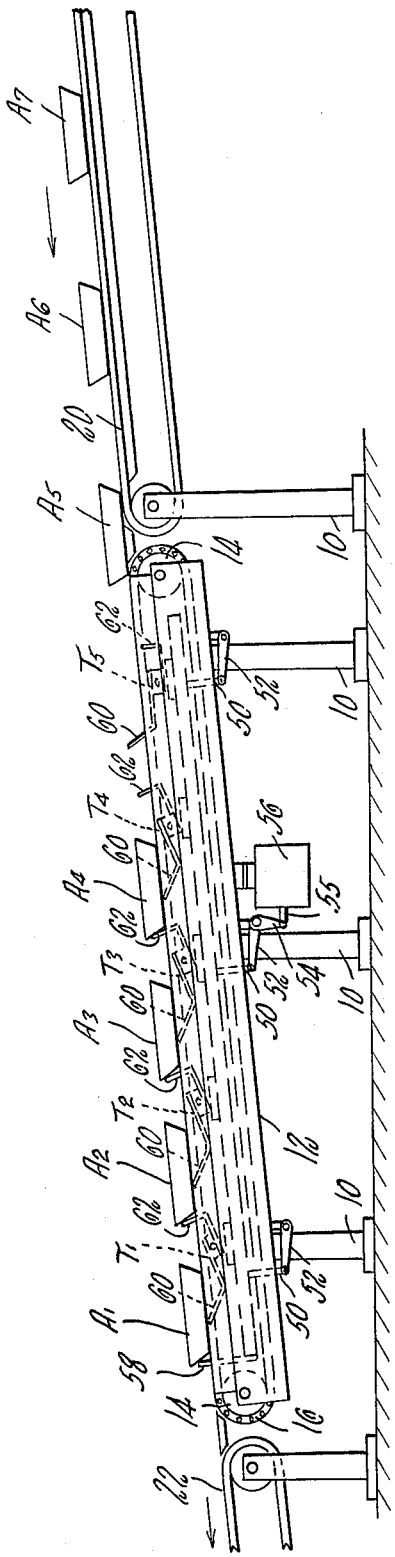

3,263,794
ARTICLE RE-GROUPING CONVEYOR SYSTEM
Richard H. Burton, Manchester, Mass., assignor to J. W. Greer Company, Wilmington, Mass., a corporation of Massachusetts
Filed Feb. 12, 1965, Ser. No. 432,232
8 Claims. (Cl. 198—34)

This invention relates to a conveyor system having means for re-grouping a series of articles, fed into said system with random or excessive spacing, into an accumulated non-contacting formation having uniform or closer uniform spacing for discharge as a group from the system.

The invention has for a particular object the provision of a reliable system for re-grouping products of uniform length advancing in spaced relation not conforming to a predetermined desired spaced relation required for proper delivery of the articles into subsequent processing equipment.

It is further an object of the invention to provide such a system which operates automatically through actuation of the moving parts by the advancing articles themselves.

A further object of the invention is to provide such a system which can be readily adjusted to accommodate articles of varying, but uniform, lengths.

A further object of the invention is to provide such a system wherein the products, as discharged, may be very closely spaced, but do not contact one another.

To this end, a typical system embodying the invention includes a pair of parallel spaced endless chains having an upper traverse along which articles are spanningly supported and advanced by frictional engagement except when halted by the successive interposition of barriers across the path of article travel in front of each product before it arrives at its proper place in the desired formation; and then simultaneously removing the barriers from the path of article travel when a predetermined number of the articles have all reached and been halted in the desired formation, thereby releasing the formation as a group to resume advance along the conveyor.

In a preferred form of the invention, the first barrier is interposed in the path of article travel responsive to the passage therebeyond of a last article in a preceding accumulated group, the succeeding barriers are successively interposed in the path of travel by the approach of each article to its proper place in the formation of an accumulated group; and the barriers are removed from the path of travel responsive to the arrival and halting of the last article in a group in its proper place in the formation.

A typical embodiment of the invention is shown in the accompanying drawings wherein:

FIG. 1 is a diagrammatic plan view of a conveyor system of the invention;

FIG. 2 is an elevational view of a portion of the system shown in FIG. 1;

As seen in FIG. 2, suitable stanchions 10 support a conveyor frame 12 having pairs of end sprockets 14 over which pass spaced parallel chains 16.

Figure 3:
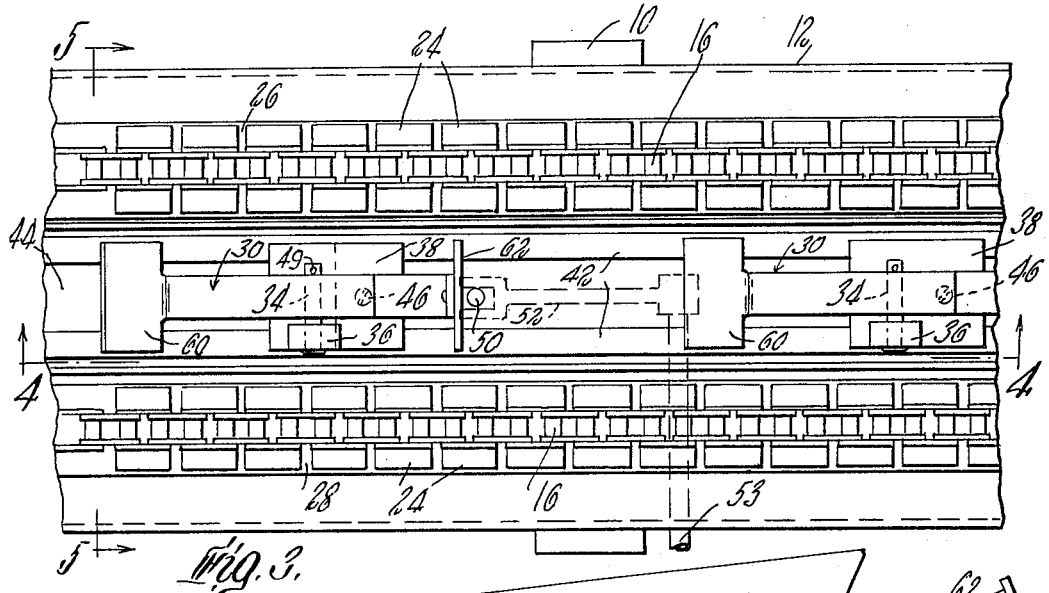
FIG. 3 is an enlarged detail of a portion of the system shown in FIG. 1.
Figure 4:
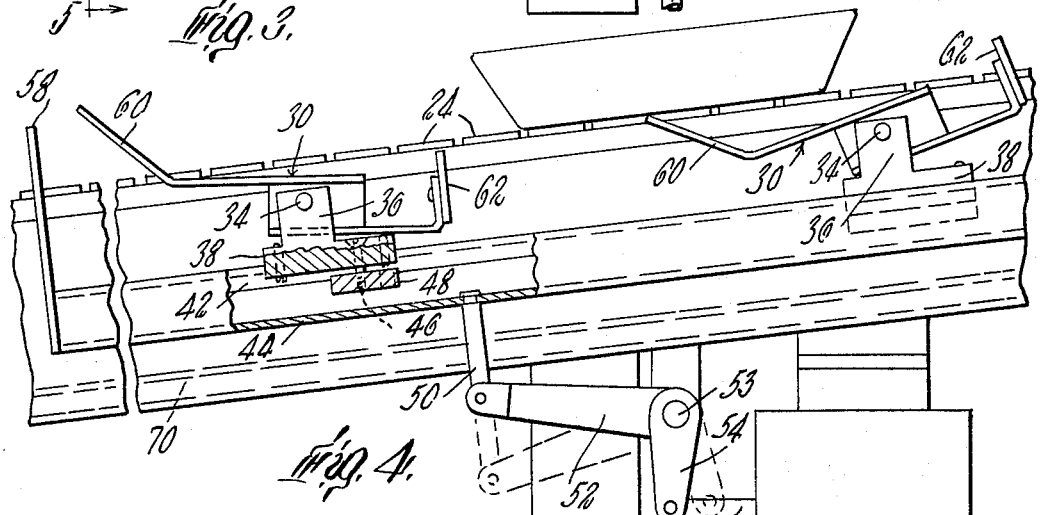
FIG. 4 is a cross-sectional view taken along the line 4—4 of FIG. 3 adding a broken away section at the left hand end.
Figure 5:
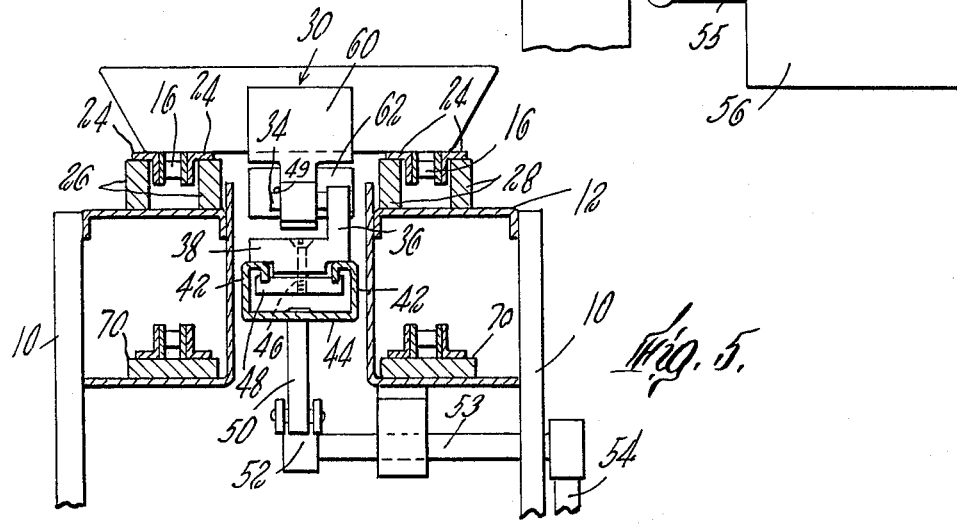
FIG. 5 is a cross-sectional view taken along the line 5—5 of FIG. 3.

An input conveyor 20 and an output conveyor 22 abut the opposite ends of frame 12 for the purpose of feeding articles into the input end and for removing products from the output end of the upper traverse of conveyor chains 16. Conveyors 20 and 22 may operate either synchronously or at different linear speeds with respect to chains 16. The articles shown in the drawings are circular pans, such as of aluminum foil, which have flared side walls so that the bottom wall has a less diameter than the diameter of the top of the pan. As shown in FIGS. 3 and 5, the chains 16 are supported during their travel along the upper traverse by engagement of longitudinally spaced slide plates 24 extending outwardly and inwardly from each of the chains 16 to engage underlying pairs of tracks 26 and 28. The bottom dimension of the pans is sufficiently large so the pans span the intervening space between the inner track 26 and inner track 28. Suitable lateral guides may be provided to prevent the pans from wandering out of the longitudinal path of travel. Such guides are not shown since they are conventional.

Mounted in a row between the chains 16 and tracks 26 and 28 is a series of equally spaced escapement units in the form of treadles 30, shown in the drawings as being five in number, each treadle being pivotly mounted on a pin 34 extending from an upstanding boss 36 carried by a block 38 slidably mounted on flanged legs 42 of a longitudinally extending U-shaped channel bar 44. The sliding blocks 38 are clamped in adjusted position along the channel by tightening bolts 46 through threaded plates 48, which engage the undersides of the inturned flanges of legs 42. Access to the bolts 46 is attained by lifting up the whole assembly, removing cotter pins 49 from pins 34 and sliding treadles 30 off pins 34.

The channel bar 44 is supported by a series of rods 50 (FIG. 2) which are pivotally linked to frame 12 through pivoting arms 52. The arm 52 of middle rod 50 is connected by a horizontal rod 53 to one end of a link 54, the other end of which is pivotally connected to a plunger 55 of a solenoid 56.

The forward end of channel bar 44, as shown in FIG. 2, has an upstanding barrier in the form of a gate 58 extending up into the path of travel of articles along the conveyor.

Each of the treadles 30 has a bent up forward portion 60 and a rear upstanding flange forming a barrier 62. The center of gravity of each treadle 30 is to the rear of its pivot pin 34 so that normally each treadle is in the upwardly rocked position of the treadle T5 shown at the right hand end of the series of treadles in FIG. 2 with its forward end 60 extending up into the path of article travel and its rear barrier 62 disposed below the path of article travel as limited by suitable stops (not shown). As an article is moved by the continuously moving chains 16 over each treadle, the article will engage the forward end 60 of the treadle and, by its weight, depress the treadle into the position of the treadles T1, T2, T3 and T4, as shown in FIG. 2. If, before an article has advanced off a treadle, it encounters the rear barrier 62 of a preceding treadle which is in depressed position, or the first barrier 58, it will be halted and hold the treadle on which it rests in a depressed position, automatically protecting its rear from a rear end collision by a succeeding article, which succeeding article will be halted by the protecting intervening raised barrier 62. In this manner, products, such as A1, A2, A3 and A4 as shown in FIG. 2, have been halted in the formation shown in FIG. 2, despite continual travel of the chains 16 with the slide plates 24 frictionally sliding beneath the bottoms of the halted articles, with the first article A1 being engaged by the gate 58 and the succeeding articles A2, A3 and A4 all being halted by preceding interposed barriers 62. In FIGS. 1 and 2, these four articles A1, A2, A3 and A4, are halted in this formation awaiting the completion of the group of five by the passing of article A5 onto the treadle T5, depressing it and allowing article A5 to move up against the rear barrier 62 of treadle T4. It will be noted that all of the barriers 62 in up position are equally spaced a distance equal to distance between gate 58 and the barrier 62 of the first treadle 30.

As soon, however, as article A5 has reached its position in the formation, an electric eye counter 64 actuates solenoid 56, whereupon both the first barrier 58 and all the treadles 30 are dropped bodily with channel bar 44 to lower the barriers simultaneously below the path of article travel so that the group of articles A1, A2, A3, A4 and A5 are free to move in their uniformly spaced formation in frictional engagement with the chain plates 24 onto the output conveyor 22 where they are again counted by an electric eye counter 66 which, upon completion of a count to 5, de-energizes solenoid 56, resets barrier 58 in time to stop the first article of the next group of five (shown in FIG. 2 as being article A6) before it reaches barrier 58, and re-elevate the treadles 30.

Such grouped formation is particularly useful when the group of articles is subsequently to be moved as a group laterally off output conveyor 22 as into an oven or cooler.

The sole essential requirement is that the input conveyor not advance articles onto the conveyor chain 16 with a spacing therebetween less than the difference between the uniform length of the particular articles and the distance between the barriers 62 of the treadles as adjustably set. Otherwise, "shingling," i.e. rear end collision and overriding of a succeeding article onto a preceding article would occur. Thus, in FIGS. 1 and 2, articles A5, A6 and A7 are shown as having a greater spacing on input conveyor 20 than the A1–A4 group.

As can be seen, the spacing of the accumulated group formation can be fairly compact because the barriers 58 and 62, which extend up into the path of travel, can be thin and, therefore, do not take up much space. The particular spacing required in the formation can readily be adjusted by moving the blocks 38 closer or further apart by sliding them along the channel bar 44.

There is thus provided an automatic self-operating system for equally spacing successive groups of articles in preparation for processing while they are passing along a continuously operating conveyor system wherein at the input end, the spacing is larger than desired or is random and non-uniform.

The return lower traverse of chains 16 is along suitable tracks 70.

What is claimed is:
1. An article re-grouping conveyor system comprising a conveyor adapted to advance articles by frictional engagement therewith,
    means for succcessively halting a succession of articles of uniform length advancing along said conveyor to form a group of articles in longitudinally equally spaced halted formation, including
    a series of barriers independently movable into the path of travel of said articles along said conveyor at equally spaced intervals greater than the length of said articles, and
    means for moving the first barrier in said series into the path of travel of a first article in said group, and
    means responsive to the proximate approach of any article in said group to a barrier interposed in its path of travel for moving the immediately succeeeding barrier in said series into the path of travel of the next succeeding article advancing on said conveyor, and
    means for simultaneously moving all said barriers simultaneously out of said path of travel to allow a halted group of articles to resume advance along said conveyor as a group in equally longitudinally spaced formation.

2. A conveyor system as claimed in claim 1 having
    means for actuating the first barrier moving means to move said first barrier into the path of travel of a first article in a group responsive to passage beyond said first barrier of a last article in a preceding group, and
    means for actuating the simultaneous barrier moving means to move all said barriers out of said path of travel responsive to the halting of the last article in a group by the interposition of one of said barriers in its path of travel by the next preceding article in said group.

3. An article re-grouping conveyor system comprising a pair of parallel spaced endless chains mounted for movement through an endless path, including an upper traverse, and adapted to advance articles spanningly supported by said chains along said upper traverse,
    a series of escapement units spaced longitudinally along said upper traverse between said chains, each unit comprising a treadle extending upwardly into the path of travel of articles advancing on said chains,
    a rear barrier on each treadle,
    each treadle being mounted for rocking movement about a horizontal axis when its forward end is depressed by the weight of an article passing thereover to raise said rear barrier into the path of and halt the advance of a succeeding article,
    a gate extending into said path of article travel in advance of the most advanced treadle in said series,
    means for intermittently moving said gate out of said path of article travel and for simultaneously lowering all said treadles bodily to drop said rear barriers below said path of article travel to allow articles which have accumulated in succession on said treadles behind said gate and barriers to proceed as a group beyond said gate in spaced relation as determined by the successive spacings of said gate and barriers.

4. A conveyor system as claimed in claim 3, wherein said moving means includes bar extending longitudinally of said conveyor between said chains beneath said treadles, said treadles being pivotly mounted on said bar.

5. A conveyor system as claimed in claim 4, wherein said gate is also mounted on said bar.

6. A conveyor system as claimed in claim 4, wherein said treadles are adjustably mounted on said bar for longitudinal movement therealong to change the spacing of said treadles.

7. A conveyor system as claimed in claim 3 having, in addition, means for counting articles advancing onto said series of treadles, and
    means for actuating said moving means responsive to said counting means attaining a count corresponding to the number of treadles in said series.

8. A conveyor system as claimed in claim 7, having in addition, second means for counting products after they advance beyond said gate and
    means for actuating said moving means to restore said gate and treadle barriers to positions extending into the path of article travel responsive to said second counting means attaining a count corresponding to the number of treadles in said series.

References Cited by the Examiner

UNITED STATES PATENTS 2,787,364     4/1957     Beck _____ 198—34

R. E. AEGERTER, *Assistant Examiner.*

EVON C. BLUNK, *Primary Examiner.*